UNITED STATES PATENT OFFICE.

WILLIAM FREDERICK COLLINS, OF LONDON, ENGLAND.

MANUFACTURE OF BRIQUETS FOR METALLURGICAL OR OTHER PURPOSES.

982,796.            Specification of Letters Patent.      Patented Jan. 31, 1911.

No Drawing.      Application filed July 27, 1908. Serial No. 445,567.

*To all whom it may concern:*

Be it known that I, WILLIAM FREDERICK COLLINS, associate of the Royal College of Science, a subject of the King of Great Britain, residing at 26 Overton road, Stockwell, London, England, have invented new and useful Improvements in the Manufacture of Briquets for Metallurgical or other Purposes; and I do hereby declare that the following is a full, clear, and exact description of the invention, which will enable others skilled in the art to which it appertains to make and use the same.

This invention relates to improvements in the manufacture of briquets for metallurgical or other purposes.

It is well known that considerable difficulty exists in the smelting of ores, or the residues of metallurgical operations, in a fine or powdery condition in metallurgical furnaces; for instance, with certain fine sand ores, on treatment in blast furnaces, the blast blows the ores out of the furnace. My invention is designed to facilitate the treatment of such ores or materials and consists in binding them together by solid water glass with or without the assistance of a metallic oxid or a calcium compound or other suitable material, the object of my invention being to prepare briquets of ore or ores, or of ore in combination with carbonaceous material or lime, or of lime alone or in combination with carbonaceous material, or of combinations of materials used for metallurgical or like purposes.

In carrying out my invention the silicate is pulverized and thoroughly incorporated with the rest of the ingredients which may include a metallic oxid or a calcium compound. During the incorporation it is necessary to pass the mass through a heated chamber or mixer, if desired steam may be injected during the process. The mixture in a heated state I submit to pressure, in forming it into blocks, by passing it through a suitable machine. Or the silicate is liquefied by subjecting it to steam pressure or to heat or otherwise and thoroughly incorporated with the rest of the ingredients (which may include a metallic oxid or a calcium compound). During the incorporation it is necessary to pass the mass through a chamber or mixer (preferably heated) and, if desired, steam may be injected during the process. The mixture in a heated state is subjected to pressure to form it into blocks. The quantity of binding material used advantageously bears a proportion of about 3% to 5% of the mass by weight.

In cases where it is possible and when thorough and rapid chemical action is desired the molded briquets may be placed under steam pressure.

In cases where briquets are liable to be abnormally subjected to the action of water or other deleterious influences I can envelop them in water resisting material in a well known manner. I wish it to be clearly understood, however, that the coating is not added for calorific or binding purposes but merely to assist the blocks in withstanding atmospheric or other action.

Having now particularly described and ascertained the nature of my said invention and in what manner the same is to be performed, I declare that what I claim is:—

1. The method of manufacturing ore briquets which consists in incorporating with the material to be briqueted, solid water-glass, as a binding agent, said water-glass being pulverized, and subjecting the pulverized water-glass to the action of heat and moisture to liquefy it, then forming the incorporated material into blocks, substantially as described.

2. The method of manufacturing ore briquets which consists in incorporating with the material to be briqueted, solid water-glass as a binding agent, the said water-glass being pulverized, and subjected to the action of heat and moisture to liquefy it, adding a hydraulic binding material, to increase the binding action of the water-glass, and forming the incorporated material into blocks.

3. The method of manufacturing ore briquets which consists in incorporating the material to be briqueted with solid pulverized water-glass, and subjecting the materials to the action of heat and moisture during such incorporation, to liquefy the powdered water-glass, and subjecting the incorporated materials to pressure, while in a heated condition, to form it into blocks, substantially as described.

4. The method of manufacturing ore briquets which consists in incorporating the material to be briqueted with solid pulverized water-glass, and subjecting the materials to the action of heat and moisture during such incorporation, to liquefy the powdered water-glass, and subjecting the incorporated materials to pressure while in a heated condition, to form it into blocks, then treating the blocks with a coating of water resisting material.

5. An ore briquet consisting of the material to be incorporated and a binder consisting of solid pulverized water-glass.

6. An ore briquet consisting of the material to be incorporated, a binder consisting of solid pulverized water-glass and a hydraulic binder to increase the binding action of the water glass.

WILLIAM FREDERICK COLLINS.

Witnesses:
W. R. MYERS,
C. H. BRENINO TAYLOR.